United States Patent [19]

Bandel et al.

[11] Patent Number: 4,581,236

[45] Date of Patent: Apr. 8, 1986

[54] PROCESS AND APPARATUS FOR REDUCTION OF ALCOHOL BY DIALYSIS IN FERMENTED BEVERAGES

[75] Inventors: Werner Bandel, Wuppertal; Franz J. Schmitz; Karl Ostertag, both of Erlenbach; Friedrich Garske; Hans G. Breidohr, both of Wuppertal, all of Fed. Rep. of Germany

[73] Assignee: Akzo N.V., Arnhem, Netherlands

[21] Appl. No.: 595,985

[22] Filed: Apr. 2, 1984

Related U.S. Application Data

[63] Continuation of Ser. No. 405,099, Aug. 4, 1982, abandoned, which is a continuation of Ser. No. 157,812, Jun. 9, 1980, abandoned.

[30] Foreign Application Priority Data

Jun. 15, 1979 [DE] Fed. Rep. of Germany ....... 2924283
Sep. 7, 1979 [DE] Fed. Rep. of Germany ....... 2936164
Oct. 27, 1979 [DE] Fed. Rep. of Germany ....... 2943518

[51] Int. Cl.$^4$ ............................................. B01D 13/00
[52] U.S. Cl. ....................................... 426/14; 426/16; 426/592; 210/641; 210/645; 210/648; 210/650; 210/669
[58] Field of Search ............... 210/637, 638, 641, 645, 210/648, 650, 651, 663, 669, 741, 805, 806, 644; 426/14, 16, 490, 493, 494, 592; 405/99

[56] References Cited

U.S. PATENT DOCUMENTS

| | | | |
|---|---|---|---|
| 1,390,710 | 9/1921 | Heuser | 426/14 |
| 2,122,761 | 7/1938 | Silhavy | 426/16 |
| 3,425,839 | 2/1969 | Pennegar | 426/16 |
| 3,702,820 | 11/1972 | Hough | 210/644 X |
| 3,956,112 | 5/1976 | Lee et al. | 210/644 |
| 3,974,068 | 8/1976 | Ebner et al. | 210/637 |

FOREIGN PATENT DOCUMENTS

| | | |
|---|---|---|
| 21247 | 6/1980 | European Pat. Off. . |
| 2135935 | 1/1973 | Fed. Rep. of Germany . |
| 2135938 | 2/1973 | Fed. Rep. of Germany . |
| 2243800 | 3/1974 | Fed. Rep. of Germany . |
| 2333094 | 1/1975 | Fed. Rep. of Germany . |
| 2415917 | 2/1975 | Fed. Rep. of Germany . |
| 2409609 | 9/1975 | Fed. Rep. of Germany . |
| 2823985 | 12/1979 | Fed. Rep. of Germany . |
| 1585376 | 1/1970 | France . |
| 2333546 | 1/1977 | France . |
| 1079517 | 8/1967 | United Kingdom . |
| 1177126 | 1/1970 | United Kingdom . |

OTHER PUBLICATIONS

Porter, M. C. et al., "Membrane Ultrafiltration", Chemical Technology, Jan., 1971.
Chemical Abstracts, vol. 92, No. 5, Feb. 1980, (Columbus, Ohio, US), p. 613, abstract 39816v, JP., A, 79119096, Sep. 14, 1979, Yamasa Shoyu., Ltd.
"Chemisch-Brautechnische Betriebs—Kontrolle" by Bausch, Billig, Silber-Eisen (pub. Paul Barey 1963), p. 101.

Primary Examiner—David Sadowski
Attorney, Agent, or Firm—Parkhurst & Oliff

[57] ABSTRACT

Fermented beverages of a reduced alcohol contents are made by causing the fermented beverage having a normal alcohol contents as produced in the fermentation to flow along one face of a dialysis membrane at a pressure differential below 5.0 bar while simultaneously a dialysate liquid which is substantially alcohol-free is passed along the other face of the dialysate membrane. An apparatus for carrying out the process comprises a housing in which two separate chambers are provided. Each chamber has separate inlet and outlet ducts. The inlet ducts are connected to separate feeding devices for liquids. Separate regulating devices are arranged for regulating the flow through each of said two chambers and means are provided for regulating the pressure differential between the two chambers.

23 Claims, 2 Drawing Figures

PROCESS AND APPARATUS FOR REDUCTION OF ALCOHOL BY DIALYSIS IN FERMENTED BEVERAGES

This is a continuation of application Ser. No. 405,099 filed Aug. 4, 1982 now abandoned which in turn is a continuation of Ser. No. 157,812 filed June 9, 1980 now abandoned.

BACKGROUND OF THE INVENTION

The invention relates to a process and an apparatus for the reduction of alcohol in fermented beverages such as beer, wine, champagne and similar.

For various reasons attempts have been made for years to make fermented beverages such as beer, wine, champagne, etc. which have a low alcohol contents. One of the reasons is the maximum limit of blood alcohol contents for automobile drivers that exists in many countries. Another important reason is that fully fermented beverages sold as available for diabetics are objectionable for this type of patients because of an alcohol contents which is higher than in normally fermented beverages.

Among the types of beer with reduced alcohol there must be distinguished three different kinds:

1. Beers of which the alcohol contents has been reduced to 2 to 3% by weight.
2. Beers in which the alcohol contents has been reduced to less than 1.5% by weight and which are usually designated as low alcohol beers.
3. Beers of which the alcohol is below 0.5% by weight and which are usually called alcohol-free beers.

Beers with reduced alcohol contents heretofore where made by two basically different methods. One method is characterized by the specific process of making and the other method consists in an aftertreatment of a normally made full contents beer.

The first category, that of different processes, comprises:

The reduction of the original wort,

The adjustment of the process to a lower terminal fermentation degree, and

The use of weakly fermenting yeasts.

The not fully fermented beers necessarily have a somewhat sweetish taste depending on the degree of fermentation and obtain a special taste by the not fermented or only slightly fermented wort. Beers which are made with less wort usually are considered as having a watery taste (draft beers).

For the aftertreatment of normally fermented beers the removal or reduction of the alcohol is carried out by three different methods:

Distillation at atmospheric pressure,

Vacuum distillation, or

Reverse osmosis.

In addition, it has been proposed to selectively separate the beer from the alcohol by means of adsorptive resins and freezing methods.

The distillation at atmospheric pressure and increased temperature results in a product of substantially different taste because of the denaturation of the proteins, the increase of hydroxymethylfurfural contents and a number of reactions of diverse beer components which reactions are not all known in detail. The phenomenon of taste changes can be somewhat diminished in case of the vacuum distillation but can not be prevented totally since beer always undergoes an undesired change of the bitter principle in case of temperature increases, no matter how minor.

Analogous processes have been used also with other fermented beverages such as wine, fruit wine, or champagne, which were intended to have a reduced alcohol contents.

Closest to the present invention is the separation of the alcohol or part of the alcohol by reverse osmosis.

Osmosis processes have been described in the German published application Nos. 21 35 938, 22 43 800, 23 33 094, 24 09 609 and 24 15 917.

For instance, in the West German published application No. 21 35 938 it has been proposed to make low alcohol contents or alcohol-free beers by means of reverse osmosis through a cellulose acetate or nylon membrane. The pressure on the side of the beer in this case must be at most 50 atmospheres gauge and can be generated by means of piston pumps having a vacuum chamber.

The shortcomings of this method are obvious. On the one hand not only the alcohol, but also the water is removed from the beer; therefore the thus concentrated beer must subsequently be diluted with water or by blending with a normally fermented regular beer in order to have the desired alcohol contents and to obtain the initial or desired original wort contents. This type of process must necessarily impair the taste. Furthermore, in this process there is always necessary a high general operating pressure and a high pressure differential at the membrane. Therefore, the production is carried out in spite of the vacuum charger intermittently and this leads necessarily to pressure variations in the system and pressure differential variations at the membrane.

A serious shortcoming of the reverse of osmosis furthermore is the high general operating pressure on the beer side of about 30 to 50 gauge atmospheres while the outflow pressure is only 4 gauge atmospheres. The resulting high pressure differential of more than 25 bar causes substantial difficulties in designing the apparatus and in addition a substantial part of the water is removed from the beer together with the alcohol. As the above listed large number of published applications shows special processes are therefore necessary to reintroduce the water into the beer.

It is therefore an object of the present invention to provide a process and apparatus for reducing the alcohol contents of a normally fermented beverage such as beer, wine, or champagne to the desired extent without causing an impairment of the taste of the beverage.

SUMMARY OF THE PROCESS INVENTION

This object is met by a process wherein a beverage which has been made in a normal fermentation process is passed along a dialysis membrane at a pressure differential of less than 5.0 bar, while simultaneously a dialysate liquid flows along the outer side of the membrane which liquid is substantially alcohol-free. This will cause part of the alcohol to escape from the fermented beer through the membrane into the dialysate liquid.

In a dialysis process the exchange of substances occurs practically only by means of diffusion. The degree of compound exchange is therefore determined by the concentration differential at the membrane. As distinguished from this kind of process in case of the reverse osmosis, the pressure differential is the determining factor and must be substantially higher than the osmotic pressure. With the pressure of the invention the osmotic pressure is not necessarily reached and the differential pressure in general is even less than 1.0 bar. The differential pressure preferably is less than 0.5 bar and the process can be carried out even though there is practically no pressure differential in existence.

DETAILS OF THE PROCESS INVENTION

The impairment of the taste in the prior art processes, apart from the above listed reasons, is also due to the fact that together with the alcohol or the alcohol-water mixture, a portion of the low molecular components such as the extractive matter are likewise separated. This separation cannot be prevented in case of the reverse osmosis except by means of an outstanding selectivity of the membrane. The reason is that if the selectivity of the membrane is too low a certain portion of the low molecular components, mainly extractive matter, will migrate together with the alcohol through the membrane partition. This is prevented in an embodiment of the present invention by providing that the extractive matter which is present in the fermented beverage in the usual concentration, is present also in the dialysate liquid. For this purpose one may use an alochol-free beverage which has been made by any desired process and which in its composition corresponds to the fermented beverage subjected to the dialysis. For instance, if a beer of reduced alcohol contents is to be made in alcohol-free beer may be used as the dialysate liquid.

In another embodiment of the invention the dialysate liquid may contain extractive matter and the alcohol which accumulates in the dialysate liquid may then be recovered by adsorption, extraction, reverse osmosis and/or distillation from the dialysate liquid. The dialysate liquid which thus has been made alcohol-free can be recirculated which is particularly important for preventing the permeation of extractive matter through the membrane since an equilibrium is rapidly reached by this method.

In case of carbon dioxide containing fermented beverages the process is preferably carried out at an increased general pressure, although the pressure differential is again kept at a very low value to prevent an ultra filtration. The pressure for carrying out the dialysis in this case must be above the satuation degree of the carbon dioxide which is dissolved in the fermented beverage in order to keep the carbon dioxide still in solution at the membrane surface and to prevent gas formation in case of permeation of carbon dioxide through the membrane. For instance, in case of champagne it is not permissible to subsequently add the amount of carbon dioxide which has been lost during the process. In case of beer this would be permissible, but it is nevertheless preferred if all of the carbon dioxide is kept in solution in the fermented beverage. For this purpose carbon dioxide may be dissolved in the dialysate liquid in an amount corresponding to the amount of carbon dioxide in the fermented beverage which is subjected to dialysis. Thus, it is possible that the fermented beverage of which the alcohol contents has been reduced, leaves the dialysis operation with the normal contents of carbon dioxide and can thus be stored in conventional manner.

In some cases it may be advisable if the fermented beverage is subjected to an ultrafiltration in addition to the dialysis.

The proportion of ultrafiltrate can be exactly adjusted by regulating the pressure differential. Normal dialysis membranes with an ultrafiltration rate of about 2 to 5 ml/m²h mm Hg permit a distinctly graduated and limited ultrafiltration.

Where a higher ultrafiltration is wanted this can be obtained in an embodiment of the invention by using a dialysis membrane having an ultrafiltration rate of 7 to 30 ml/m² h mm Hg. Such membrane is the subject matter of the German patent application No. P 28 23 985.5

The additional ultrafiltration can also be obtained by increasing the differential pressure from a preceding lower value to a value between 0.5 and 5.0 bar. In most cases a sufficient ultrafiltration can be obtained in order to effect an improvement of the taste if the dialysis is carried out at a differential pressure increasing from 0.5 bar up to 1.0 bar.

Particularly where composite solutions (including extractive matter) are used as a dialysate liquid it is advisable to carry out the ultrafiltration step separate from the dialysis step. Since in the dialysis step the danger exists that a loss of extractive matter occurs in the fermented beverage, it is preferred that the separate ultrafiltration step be carried out subsequent to the dialysis step.

To carry out a limited ultrafiltration in addition to the dialysis it is of particular advantage where the quality of wine having a reduced alcohol contents is to be improved. In some types of wine the contents of extractive matter, for instance, is lower due to unfavorable weather conditions. This results then in a stale taste. In this case the process of the invention will accomplish a marked improvement of the taste in addition to the reduction of the alcohol.

An ultrafiltration may be used in addition to the dialysis also in case of champagne and beer is such appears necessary.

APPARATUS INVENTION

It is also an object of the present invention to provide for an apparatus which avoids the above-discussed shortcomings of the prior art and which in addition may be used, not only for making beers of lower alcohol contents or alcohol-free beers, but also for the purpose of reducing the alcohol contents of other fermented beverages such as wine, champagne. etc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

SUMMARY OF THE APPARATUS INVENTION

Figure 1:
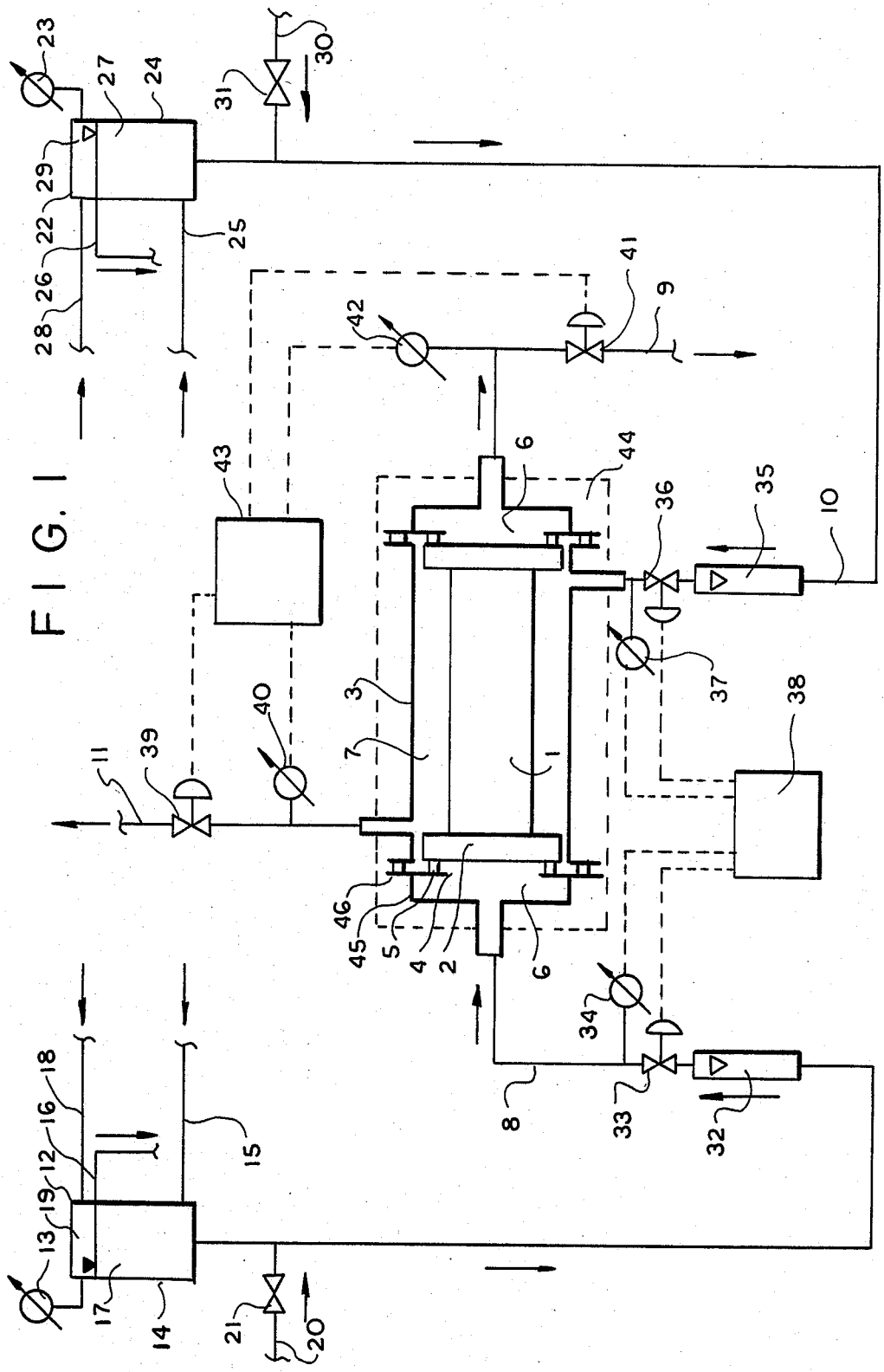
FIG. 1 shows in a simplified schematic manner an apparatus for carrying out the process for the invention.

The apparatus for carrying out the process of the invention comprises a housing in which two separate chambers are formed. The chambers are separated by a dialysis membrane in fluid-tight manner. Separate feeding devices for liquids adapted to operate at a constant pressure are provided for each one of the two chambers. Separate inlet ducts connect the chambers with two feeding devices, one for each of the two chambers. Separate outlet ducts are also provided for the two chambers and there are provided means for regulating the flow through said inlet ducts or outlet ducts or to both of said types of ducts and furthermore means are provided for causing a minor pressure differential to develope between the two chambers.

PREFERRED EMBODIMENTS OF THE APPARATUS INVENTION

Membranes for use in the above apparatus may be either dialysis hollow fibers or dialysis tubings or dialysis flat foils which latter may be disposed in a plane or may be of a curved shape.

Highly suited for the apparatus of the invention is a membrane which is formed by the regeneration of cellulose from a cupramonnium-cellulose solution.

Particularly good results are obtained with the apparatus if the membrane has a lower permeability for molecules of a molecular weight in excess of 100. In general this type of membrane is preferred if it has a particularly high selectivity and also a particularly sharp separation line.

The advantage of a membrane with a distinct separation line is that through such membrane almost exclusively the alcohol will permeate while other lower molecular components such as for instance sugar, the bitter principle, aromatic components, etc. penetrate the membrane to a lower degree or not at all.

A further advantage of the use of a dialysis membrane is that no high pressure differential is necessary at the membrane to selectively separate the alcohol, as such is required in case of reverse osmosis.

It is preferred to use a device where the pressure between the first and the second chamber which normally corresponds to the pressure differential acting on the membrane is extremely low. Particularly good results are obtained if the pressure differential is not more than 0.1 bar. Good results, however, may still be obtained at a pressure differential of 0.5 bar and in specific cases up to 5.0 bar.

In order to obtain the desired pressure differential at the membrane the apparatus is provided with highly sensitive regulators in the two inlet and/or outlet ducts.

It is preferred to have the membrane in the form of a shaped body which is detachably connected with the housing. This form permits to exchange the membrane if desired.

Because of the compact design of the apparatus, what desirably has a large exchange surface disposed in a small space, hollow fiber bodies are preferred for the membrane. The membrane then consists of a multiplicity of hollow fibers. The hollow fibers may be in the form of straight generally parallel fibers or they may be in the form of regular or also irregular loops or in the form of three-dimensional coils or in the form of spirals disposed in a plane. The hollow fibers may also be arranged in several layers in a manner that the fibers of one layer cross the hollow fibers of the adjoining layer, if desired in several places. The open ends of the hollow fibers may then be embedded in a cast mass without closing up the entrance to the cavity of the fibers.

The shaped membrane body may have any desired cross section.

The housing for the dialysis membrane body, the inlet and outlet ducts, the fluid gaskets, the separating walls, the feeding devices, and also the important flow regulators and pressure regulators may be made of any conventional metallic or non-metallic material. However, at least those parts which are in contact with the liquids must comply with the laws of the country applying to the food industry.

In dimensioning the parts of the apparatus there should be taken into consideration the dimensions of other apparatus and devices which are operating in the particular factory.

If an apparatus is used which permits an operating pressure considerably above atmospheric pressure the reduction of the alcohol can still be effected at the most favorable pressure differential for that beverage in order, e.g. in case of atmospheric pressure to avoid the sudden separation of part of the dissolved carbon dioxide in case of champagne or the foaming in case of beer.

An apparatus for the nominal pressure 16 is usually sufficient for the normal operating requirements. It is, however, of advantage to build the apparatus as available also for higher pressures.

It is preferred to feed the fermented liquid on one hand and the alcohol receiving dialysate on the other hand in a steady manner and under no circumstances in a pulsating or intermittent way in order to have a constant quality of the treated beverage and to the extent possible a steady separating performance of the membrane and also to have the desired advantage of low pressure differential at the membrane. In order to feed the two liquids along the membrane faces, there may be used pumps. It is preferred to use a feeding device which operates without moving parts and only at a static pressure.

Such feeding devices, for instance may comprise a vessel containing the liquid in which a steady liquid level is maintained. In order to increase the static pressure such apparatus may be formed in a closed manner and may be in addition connected with a pressure gas duct in order to obtain a cushion of a pressurized gas above the level of the liquid in the container.

It is preferred to use in this case a gas not containing free oxygen, preferably carbon dioxide and/or nitrogen. By using such gas an impairment of the treated liquid by the oxygen of the air is thus avoided.

The advantages of a device which does not have moving parts is not only to avoid wear and tear, but also to feed the liquids in a gentle manner and upon exclusion of air, thus the oxygen of the air and any abrasive matter from the pumps or pump gaskets will not enter the liquids.

If exactly working flow regulators are used it is possible with this kind of feeding device to obtain a highly uniform volume flow per unit of time. Particularly suited for obtaining this objective are so called apertured partitions. A change of the flow through this type of partition is for instance possible by changing the inlet pressure. If it is desired to vary the flow-through amount at constant inlet pressure, so-called needle valves may be used for adjusting the flow amount. They permit a fine adjustment of the flow amount and also permit to maintain the once adjusted flow amount to remain constant through long periods of time. The devices for adjusting the amount of flow can be disposed before and/or following the housing which contains the separating membrane. It is also possible to employ other suitable and technologically acceptable devices obtaining constant flow amounts if they meet the requirements of a constant volume flow. The regulators can also be equippd with electrical, pneumatic, hydraulic or similar motor propulsions which may be connected with conventional measuring devices so that the amounts of flow can be controlled automatically and, if necessary, can be corrected in the same way or can be changed by a remote control. The same applies to the adjustment and changes of the level of the liquid and the pressure pad formed by a gas as described above. For instance if a constant flow ratio between fermented beverage and dialysate is desired, the regulating devices can be coupled together so that an amount of one fluid causes an amount of flow change in the other fluid and this at a predetermined ratio. It can likewise be of advantage to provide for an amount of the two liquids which depends on the flow-through properties which may then also be changed automatically if one of the flow amounts changes.

In order to keep the liquids, for instance the final or semifinal beverage, at a lower temperature than the room temperature, the apparatus may be equipped with means to adjust the temperature of the liquids flowing through the first and/or the second chamber. Such device in a simple case, that is, if the liquid has already undergone a precooling, may consist in a heat insulation of all or at least some parts of the apparatus. It is, however, also possible to use tubes, containers, and other parts which are equipped with a heating or cooling jacket in order to obtain the tempering of the liquids by means of a heated or cooling fluid and it is thus also possible to adjust the two liquids in the device to different temperature levels before and/or after the treatment.

To prevent that during the treatment of liquids which contain dissolved gas, for instance carbon dioxide as in case of champagne, a reduction of the amount of dissolved gas occurs by diffusion through the separating membrane an embodiment of the apparatus provides that gas dosage feeding devices, particularly for carbon dioxide, may be arranged in one of the inlet ducts and/or one or both of the outlet ducts.

Such devices will permit for instance in case of the dialysate to dissolve a necessary amount of the gas in the liquid in order to prevent the diffusion of gas from the other liquid through the membrane. Another possibility to balance the loss of dissolved gas is that only in the liquid which uses gas a corresponding additional amount of gas is provided in solution so that the liquid after treatment has the desired gas contents.

It is also possible to replace the proportion of gas which is lost during the treatment only after the treatment has been finished. Also, a combination of the three methods described is possible. Which method is most pratical can be determined by simple tests and depends in many cases on the existing rules and regulations, etc. The solution of gas in one or both liquids, particularly of carbon dioxide is best carried out in a completely closed liquid containing vessel of the feed device. In this case it is possible to avoid all contact of the liquid with the oxygen of the air, and to provide for a constant and gentle feeding of the liquid which is necessary to obtain the desired pressure in the pressure cushion above described and to effect the dissolving of the gas in the liquid.

It is also possible to charge the liquids with a gas mixture, for instance of nitrogen and carbon dioxide. For this purpose additional gas inlet ducts may be provided or the gas mixture may be included in a preformed composition. This operation is of particular advantage if on the one hand a high gas pressure cushion is necessary, and on the other hand only an amount corresponding to a lower partial pressure of gas should be dissolved in the liquid. Thus, this operation is preferred if, as in case of champagne, a higher pressure is necessary for the pressure cushion than corresponds to the partial pressure of the dissolved carbon dioxide. In this case a gas cushion consisting only of carbon dioxide would cause undesired additional carbon dioxide to dissolve in the champagne. However, in case of a gas pressure cushion of pure nitrogen, the carbon dioxide would escape by diffusion from the champagne into the nitrogen atmosphere even at a pressure which is higher than the partial pressure of the dissolved carbon dioxide.

Depending on the type of operation and depending on the time period for passing a specific volume of treated liquid further modifications may be made, for instance, instead of one large dialysis-shaped membrane body, several smaller shaped dialysis membrane bodies may be used, each one disposed in its own housing and arranged in parallel so that each membrane body will receive only a specific partial portion of the total volume flow as regulated by the regulating devices. This arrangement also permits to exchange one membrane body during the operation of the apparatus without interrupting the total operation, or may permit to provide for a number of replacement membranes which would be connected only if necessary without interrupting or reducing the total volume flow.

An arrangement in series of two or several membranes may also be considered if the alcohol contents of a liquid is to be reduced gradually and possibly up to a value near zero.

To control the volume flow as it occurs initially, regulating devices may be provided at suitable places in the inlet and/or outlet ducts.

In case of the use of several membrane bodies arranged in parallel it is advisable to provide a separate flow meter and separate adjusting devices for each membrane body.

Regarding the direction of flow of the two liquids along the membrane faces these may be arranged in concurrent, countercurrent or crosscurrent manner. Even intermediate forms as for instance cross-countercurrent or cross-cocurrent are possible. The question, which of the several possibilities is most suited, depends on the individual case and will frequently not only be determined by the most favorable flow current, but also by technological flow considerations as, for instance, by the requirement of a particularly low pressure differential at the membrane surface.

PREFERRED APPARATUS EMBODIMENTS

With reference to FIG. 1 of the drawings, it will be seen that there is provided a membrane 1 in the form of a shaped body which is disposed in the housing 3 and is provided with flanges 2 at its front faces which consist of a cast material and which, together with the gaskets 5 and the partition walls 4 provide for a liquid-tight separation of the first chamber 6 from the second chamber 7 of the housing. The membrane body is connected to a detachable manner with the housing so that it can be removed after removing one of the gaskets 46 which connect in a detachable way with the front portions 45. This will permit the exchange of the membrane.

The first chamber 6 has an inlet duct 8 and an outlet duct 9. The second chamber 7 has a similar inlet duct 10 and an outlet duct 11. The inlet duct 8 connects to a feeding device 12 for the liquid and works only with static pressure. The inlet duct 10 similarly connects with a similar second feeding device 22. Both feeding devices 12 and 22 comprise, each, closed vehicle receptacles 14 or 24, liquid inlet ducts 15 and 25 and liquid overflow ducts 16 and 26, all of which serve to adjust constant liquid levels 17 and 27. They further comprise gas inlet ducts 18 and 28 for generating the gas pressure cushions 19 and 29 above the liquid levels 17 and 27. The pressure of the gas cushions may be measured and controlled by means of manometers 13 and 23. Both inlet ducts 8 and 10 are connected via the closure valves 21 and 31 to gas inlet ducts 20 and 30.

In order to control the flow amount per unit of time of the fermented beverage and also of the dialysate liquid a device for measuring the flow amounts 32 and 35 is provided in each of the inlet ducts 8 and 10. To adjust the flow amount two valves 33 and 36 are provided which are controlled by a common regulator 38. Pressure meters and adjustment devices 34 and 37 are also connected with the regulator 38 in order to control the differential pressure which should be as low as possible between the first and the second chamber. There are furthermore provided in each of the outlet ducts 11 and 9, valves 39 and 41 and furthermore pressure meters and adjustors 40 and 42 all of which are connected with the adjusting device 43.

The two adjusting devices 38 and 43 can be coupled together or form one single unit. This arrangement would permit to adjust the desired pressure level in the two chambers over a broad range at a predetermined flow and also to adjust the desired pressure differential at the separating membrane which should be as low as possible.

If desired, the housing 3 may be provided with a heat insulating jacket 44. In addition the various ducts and devices can also be heat insulated or heat adjusting special tubes or devices may be employed. It is of course also possible to arrange the entire apparatus in a room which has the desired temperature.

Any conventional devices arrange ahead of or behind the apparatus of the invention in the direction of flow are not shown in the drawing.

Figure 2:
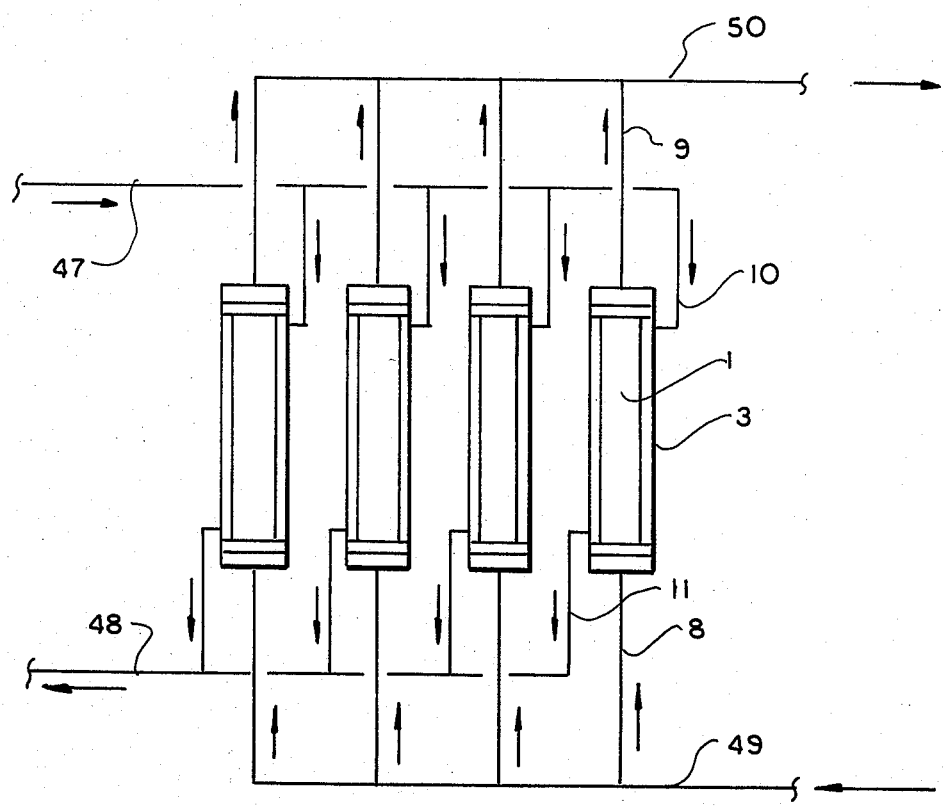
FIG. 2 shows in a similar manner a section of a different embodiment of the apparatus in which several shaped membrane bodies are provided in parallel.

FIG. 2 illustrates a parallel arrangement of four membrane bodies 1 each of which is placed in a different housing 3. Parts of this embodiment shown in FIG. 1 are not repeated in FIG. 2. Each membrane body is connected with its first inlet and outlet ducts 8 and 9 to a common main inlet duct 49 or common main outlet duct 50. Its second inlet and outlet ducts 10 and 11 in a similar way are connected to a common second main inlet duct 47 and second main outlet duct 48.

To regulate and measure the individual partial flows through each of the membrane bodies there may be provided corresponding measuring and regulating devices are shown in FIG. 1 in each of the inlet and/or outlet ducts. The main inlet ducts 47 and 49 are connected to separate feeding devices which are not shown in FIG. 2 and are similar to those shown in FIG. 1.

EXAMPLES OF THE PROCESS INVENTION

The invention will further be illustrated in the following examples using the alcohol reduction of beer and wine for this purpose. In case of champagne, fruit wine or sake and similar fermented beverages there may be obtained similar fermented beverages of reduced alcohol contents which have a likewise unimpaired taste.

EXAMPLE 1

This Example applies to a beer which belongs to the group normally sold under the name "Pilsner". The beer had an initial wort contents of 12%, an alcohol contents of 3.91% by weight and an extractive matter contents of 3.93%. The alcohol contents was determined according to the rules laid down in "Chemisch-Brautechnische Betriebskontrolle" by Bausch, Billig, Silber-Eisen, (publisher Paul Barey 1963), page 101" which is generally used in the brewing industry.

The determination of the contents of extractive matter likewise was effected according to this method.

For the dialysis a dialysator was used which comprised a bundle of cellulosic hollow fibers spun from a cuprammonium-cellulose solution. Similar dialysis hollow fiber membranes are well known from the hemodialysis machines.

The exchange phase of the hollow fiber membrane comprised a surface of 1.3 $m^2$. At a temperature of 10° C. and a general operating pressure of 4 bar, beer was passed through the hollow filaments at a speed of 30 $l/h \cdot m^2$ while at the outer side of the hollow fibers water passed as the dialysate at a speed of 11.5 $l/h \cdot m^2$. The water had the same temperature as the beer. The differential pressure was 0.05 bar, the beer having a slightly higher pressure.

After adjusting the equilibrium a beer was obtained of which the alcohol contents was reduced by 30% while the contents of extractive matter was lowered only by about 10%. An examination regarding taste showed that a beer was obtained of which the taste was fully comparable to the initial beverage.

By lowering the throughput of beer to about one-third while keeping the amount of dialysate liquid unchanged, a reduction of the alcohol contents by 65% was obtained. This, therefore, was then a beer which may be called a low alcohol contents better. Its taste is definitely richer than that of a beer with the same low alcohol contents made by any of the prior art processes. If the dialysate liquid contained beer extractive matter then the taste was completely comparable to that of the initial beer.

If it is desired to obtain a so-called alcohol-free beer, that is a beer with the alcohol contents of about 0.5% by weight, this can be accomplished by further reducing the throughput of beer again to one-half of the previous experiment, while leaving the amount of dialysate liquid unchanged. In this case better tasting beers may also be obtained if beer extractive matter is added to the dialysate liquid.

EXAMPLE 2

A beer of the same properties as used in Example 1 was subjected to dialysis in a hollow fiber dialysator having a 1.3 $m^2$ exchange surface. The temperature was 10° C. and different speeds of the liquid flows were tested. Starting from an original wort contents of 12%, an alcohol contents of 3.91 contents and an extractive matter contents of 3.93%, the analysis results of the following Table 1 were obtained after the dialysis. The pressures and the pressure differential were the same as in Example 1.

TABLE I

| Speed | Alcohol contents of the beer | Extract controls of the beer |
|---|---|---|
| (prior to the dialysis, | 3.91% | 3.93%) |
| (a) 23.0 l/h · m² beer<br>23.0 l/h · m² water | 2.33% | 3.40% |
| (b) 11.5 l/h · m² beer<br>11.5 l/h · m² water | 1.93% | 3.07% |
| (c) 6.9 l/h · m² beer<br>6.9 l/h · m² water | 1.12% | 2.62% |
| (d) 4.6 l/h · m² beer<br>4.6 l/h · m² water | 0.74% | 2.29% |

EXAMPLE 3

In this case wine was subjected to dialysis in an analogous manner in a hollow fiber dialysator having an exchange surface of 1.3 m² as in Examples 1 and 2. At an operating pressure of 4 bar and a temperature of 10° C. the wine was passed through the hollow fibers, while at the outside of the fibers a fully desalted water was used as the dialysate liquid at the same temperature. The pressure differential was 0.05 bar except in case of the test d below where it was 0.5 bar. The wine had the higher pressure.

The results obtained in this dialysis appear from the following Table II. The wine employed in this example had an alcohol contents of 67.9 g/l, an extractive matter contents of 20.5 g/l and an acid contents of 6.85 g/l (calculated as tartaric acid).

TABLE II

| | Wine subjected to dialysis | | |
|---|---|---|---|
| Speed | alcohol contents | extract contents | acid contents |
| (a) 13.6 l/h · m² wine<br>4.6 l/h · m² water | 49.7 g/l | 15.0 g/l | 5.1 g/l |
| (b) 18.7 l/h · m² wine<br>4.6 l/h · m² water | 49.4 g/l | 16.2 g/l | 5.5 g/l |
| (c) 27.7 l/h · m² wine<br>4.6 l/h · m² water | 54.0 g/l | 15.5 g/l | 5.9 g/l |
| (d) 17.9 l/h · m² wine<br>4.6 l/h · m² water | 52.9 g/l | 16.6 g/l | 5.6 g/l |

EXAMPLE 4

In this case the same dialysate as in Examples 1 to 3 was used under the same conditions as in Example 3. The dialysate liquid in each case was subjected to a removal of the alcohol in an aftertreatment by means of vacuum distillation. The dialysis liquid was then replenished to the desired volume by fully desalted water and was again reused. The beverage subjected to the dialysis was a wine having 80.8 g/l alcohol contents, 21.2 g/l extractive matter contents and 8.2 g/l contents of acid. For the dialysis liquid in the first run fully desalted water was used.

The results obtained in the first tests up to obtaining an equilibrium appear in the following Table 3. The pressure differential in the test was 0.15 bar.

TABLE III

| | | wine subjected to dialysis | | |
|---|---|---|---|---|
| Through-put | Speed | alcohol contents | extract contents | acid contents |
| (1) | 13.9 l/h · m² wine<br>4.8 l/h · m² water | 56.9 g/l | 15.7 g/l | 6.03 g/l |
| (2) | 13.2 l/h · m² wine<br>4.7 l/h · m² dialysate | 60.1 g/l | 18.8 g/l | 7.3 g/l |
| (3) | 12.7 l/h · m² wine<br>4.5 l/h · m² dialysate | 58.1 g/l | 20.1 g/l | 7.7 g/l |
| (4) | 12.9 l/h · m² wine<br>4.6 l/h · m² dialysate | 55.8 g/l | 20.5 g/l | 8.04 g/l |

EXAMPLE 5

In this Example a dialysis of champagne was carried out. For this purpose two dialysators each having 1.9 m² exchange surface and a steel housing were arranged in series. As dialysate liquid a champagne was employed from which part of the alcohol was withdrawn by vacuum distillation and which was diluted with fully desalted water to the original volume and was saturated with carbon dioxide.

The general operating pressure was 4.7 bar. The pressure differential at the outlet side was 0.20 bar and the temperature 10° C. The champagne was passed through the dialysator at a flow speed of 1.39 l/h·m² while on the other side of the membrane the described dialysate liquid was caused to flow at a speed of 1.38 l/h·m².

The alcohol contents of the champagne was lowered by the dialysis from originally 89.2 g/l to 51.3 g/l. The extractive matter contents of 22.3 g/l and the acid contents of 9.4 g/l were not changed in this case. The taste was entirely the same as that of conventional champagne.

In the following examples an apparatus was used which in detail is as shown in FIG. 1, but specifically corresponds to FIG. 2. In this apparatus it was possible to switch on up to 5 hollow fiber units arranged in parallel. The individual units had the same size and the same exchange surface (membrane surface). Each unit was placed in a separate housing. The fluid amount passing through each unit could be controlled by individual measuring and regulating devices for each unit, that is independent from the other units. All units were connected to a main duct for the beverage to be treated and a main duct for the dialysate. The beverage passed inside through the hollow fibers while the dialysis flowed around the fibers.

The following tests were carried out with different types of beer which, for instance, are known under the German designations "Kölsch", "Pils", "Export" and "Diät-Bier". As dialysate completely desalted water was used.

EXAMPLE 6

Exchange surface for each of the five hollow fiber units about 1 m²

Number of hollow fibers per hollow fiber unit about 10,000

Wall thickness of the hollow fibers (membrane thickness) about 11μ

Diameter of the hollow fibers about 200μ

Ultrafiltration rate of the hollow fibers 4 ml/h·m².mm Hg

The hollow fibers were in the form of a bundle of generally parallel fibers which were cast into a housing of synthetic material.

Flow amount of beer per unit 6.3 to 63 l/h

Flow amount of dialysate per unit 6.3 to 63 l/h

Temperature of the beer and dialysate about 10° C.

Maximum pressure obtainable on the beer side (absolute) about 4 bar
Maximum pressure on the dialysate side (absolute) about 3.95 bar
Pressure differential 0.05 bar
Alcohol contents of the beer prior to the treatment 3.7 to 4.7%
Alcohol contents of the beer after the treatment 1.7 to 3.0%

EXAMPLE 7

Exchange surface of each of the five hollow fiber units about 6 m²
Number of hollow fibers per hollow fiber unit about 40,000
Beer flow per unit 40 to 400 l/h
Dialysate flow per unit 40 to 400 l/h All other dates and values in this example are as in Example 6. The hollow fiber membrane body was placed in a stainless steel housing, but could be separately removed.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for producing a fermented beverage having a reduced alcohol content, comprising:
   (a) producing a fermented beverage of normal ethyl alcohol content,
   (b) introducing said fermented beverage into a first dialysis chamber, said first chamber being separated from a second dialysis chamber by a dialysis membrane which is substantially less permeable to sugars in said fermented beverage than to ethyl alcohol,
   (c) introducing a substantially alcohol-free dialysate liquid, miscible with said fermented beverage, into said second chamber, and
   (d) causing said fermented beverage and said dialysate liquid to flow along opposite faces of said dialysis membrane at a pressure differential below 5.0 bar, a portion of the ethyl alcohol content of said fermented beverage passing through said dialysis membrane into said dialysate liquid without substantial permeation of said sugars through said membrane.

2. The process of claim 1 wherein the dialysate liquid, except for its alcohol content, is of substantially the same composition as said fermented beverage.

3. The process of claim 1, wherein the dialysate liquid contains the same low molecular extractive matter as present in the fermented beverage so as to prevent an excessive amount of extractive matter from passing with the alcohol through the membrane into the dialysate liquid.

4. The process of claim 1, wherein the pressure differential between the fermented beverage and the dialysate liquid is less than 1.0 bar.

5. The process of claim 1, wherein the pressure differential between the fermented beverage and the dialysate liquid is less than 0.5 bar.

6. The process of claim 1, wherein the pressure differential between the fermented beverage and the dialysate liquid is less than 0.1 bar.

7. The process of claim 1, wherein the fermented beverage is subjected to a limited ultrafiltration step in addition to dialysis.

8. The process of claim 7, wherein the ultrafiltration step is effected as a step separate from said dialysis.

9. The process of claim 8, wherein the ultrafiltration step is carried out subsequent to the dialysis.

10. The process of claim 7, wherein the ultrafiltration step is effected by increasing the differential pressure from a preceding lower pressure to a pressure between 0.5 and 5.0 bar.

11. The process of claim 7, wherein the ultrafiltration step is effected through use of a membrane having an ultrafiltration rate of 7 to 30 ml/m² mm Hg.

12. The process of claim 1 wherein the dialysis membrane has a lower permeability for molecules of a molecular weight of more than 100 then for molecules of a molecular weight of less than 100.

13. The process of claim 1, wherein alcohol accumulated in the dialysate liquid is removed in an aftertreatment by adsorption, extraction, reverse osmosis or distillation.

14. The process of claim 13, wherein dialysate liquid from which alcohol has been removed is recirculated into the second chamber.

15. The process of claim 1, wherein said fermented beverage contains an amount of carbon dioxide and pressure of the dialysis is above 9 saturation pressure of the carbon dioxide dissolved in the fermented beverage to keep the carbon dioxide in solution at said faces of the membrane and to prevent gas formation upon permeation of carbon dioxide through the membrane.

16. The process of claim 15, wherein the dialysate liquid contains an amount of carbon dioxide which corresponds to the amount of carbon dioxide in the fermented beverage.

17. The process of claim 1, wherein the fermented beverage is a beer.

18. The process of claim 1, wherein said dialysis membrane is substantially impermeable to molecules of a molecular weight greater than 100.

19. The process of claim 1, where said dialysis membrane is substantially impermeable to sugars.

20. The process of claim 1, wherein said dialysate liquid comprises water and said fermented beverage is selected from the group consisting of beer, wine, fruit wine and champagne.

21. The process of claim 1, wherein said dialysate liquid is derived from a liquid having substantially the same composition as said fermented beverage, and has a reduced alcohol content in comparison to said normal ethyl alcohol content of said fermented beverage.

22. The process of claim 1, wherein said dialysate liquid is caused to flow in a direction opposite to a direction of flow of said fermented beverage.

23. A process for producing a fermented beverage having a reduced alcohol content, comprising:
   (a) producing a fermented beverage of normal ethyl alcohol content,
   (b) introducing said fermented beverage into a first dialysis chamber, said first chamber being separated from a second dialysis chamber by a dialysis membrane which is substantially impermeable to molecules of a molecular weight of about 100 and greater and is substantially less permeable to sugars in said fermented beverage than to ethyl alcohol,
(c) introducing a substantially alcohol-free dialysate liquid, miscible with said fermented beverage, into said second chamber, and
(d) causing said fermented beverage and said dialysate liquid to flow along opposite faces of said dialysis membrane at a pressure differential below 5.0 bar, a portion of the ethyl alcohol content of said fermented beverage passing through said dialysis membrane into said dialysate liquid.

* * * * *

UNITED STATES PATENT AND TRADEMARK OFFICE
CERTIFICATE OF CORRECTION

PATENT NO. : 4,581,236
DATED : April 8, 1986
INVENTOR(S) : Werner BANDEL et al

It is certified that error appears in the above-identified patent and that said Letters Patent is hereby corrected as shown below:

Column 2, line 31, change "charger" to --changer--.

Column 13, line 49, after "bar," insert --whereby--.

Column 13, line 58, after "molecular" insert --weight--.

Column 14, line 20, change "then" to --than--.

Column 14, line 31, change "9" to --a--.

Signed and Sealed this

Ninth Day of September 1986

[SEAL]

Attest:

DONALD J. QUIGG

Attesting Officer    Commissioner of Patents and Trademarks